May 17, 1927.

A. E. SCHEIN 1,629,314

RADIAL BEARING

Filed Dec. 8, 1921

Inventor
ALEXANDER E. SCHEIN
By his Attorney
Herbert H. Thompson

Patented May 17, 1927.

1,629,314

UNITED STATES PATENT OFFICE.

ALEXANDER E. SCHEIN, OF BROOKLYN, NEW YORK, ASSIGNOR TO THE SPERRY GYROSCOPE COMPANY, OF BROOKLYN, NEW YORK, A CORPORATION OF NEW YORK.

RADIAL BEARING.

Application filed December 8, 1921. Serial No. 520,790.

This invention relates to the art of the lubrication of so called plain bearings. It is now well recognized that in radial bearings, especially, a film of oil builds up between the bearing and its shaft, due to the rotation of the latter, which separates the bearing and the shaft, so that the metals of the shaft and bearing never touch, but are separated by an oil film of appreciable thickness. In order that this oil film may be formed, I have discovered that it is necessary that a proper distribution of the load on the bearing be maintained. For instance, it has long been known that bearings on which the load varies in direction and amount, are much more difficult to lubricate properly, than bearings on which the load is constant, due doubtless to the fact that a bearing on which the load is constant will wear or wipe at points where the most friction occurs, so as to make room for the oil film at that point, so that the bearing automatically corrects such defects in design, but at the expense of a high coefficient of friction during this action. A bearing on which the load is variable in direction or amount, or both, however, cannot so effectively wear into the proper shape. It is also true that the oil film takes time to build up properly. For instance, when the shaft is first started, no oil film is present and considerable friction results, until the oil starts building up under the friction surfaces. I have also determined that unless the load is uniformly distributed, lengthwise for instance on the bearing and especially where very heavy pressures per square inch of bearing surface are employed, the oil will be squeezed out at points of maximum pressure and result in wiping the bearing at those points.

The purpose of this invention is to provide a simple but effective means for avoiding the difficulties above stated, by providing a bearing which will automatically take up any unevenness in distribution of the load or variations in the same, so as to provide a uniform oil thickness throughout the length of the bearing at all times and also provide a bearing which will automatically take care of increases in the load at any one point, so that the oil film may be continuous around and along the bearing.

To effect the above purpose, I propose to employ as a lining for the bearing, a babbitt or other substance which elastically deforms easily, or in other words, which has a low modulus of elasticity. The relations between these factors may be shown by the equation;

$$D = \frac{P \times T}{e}$$

Where
D = deformation
P = load per unit area
T = thickness of the metal
e = the modulus of elasticity Solving the equation for T, the thickness of metal required for any given condition, we have $$T = \frac{De}{P}$$

Therefore, in selecting the Babbitt or other metal for my improved bearing, I do not strive to have as the most essential element of the babbitt a low co-efficient of friction, since in the bearing according to my invention, the metal of the bearing never comes in contact with the shaft except in starting, but is separated at all times by the oil film. I therefore propose to employ a babbitt or other metallic lining having a low modulus of elasticity as the first requirement and also of requisite softness to prevent damage to the shaft in case of the bearing running dry. In addition to employing a babbitt of the above qualifications, I so design the bearing that the thickness of the babbitt at each point is at least equal to $$\frac{D \cdot e}{P}.$$

As far as I am aware, it has never before been realized that the thickness of the babbitt played an important part in the behavior of the bearing, it being considered proper to use enough babbitt so that if the bearing ran dry, there would be sufficient babbitt to prevent the shaft from coming in contact with the harder portions of the bearing before the shaft could be stopped. I propose therefore, not only to use a babbitt or other metal having a low modulus of elasticity, but to increase the thickness of the babbitt, especially at the points of maximum deflection, (continuous or variable), or in other words the points at which the load would otherwise be a maximum so that uniform distribution of the load may be effected, by the yielding of the babbitt at points of maximum deflection.

My invention would perhaps be best understood by reference to the drawings illustrating the several forms which the invention may take.

Figure 1:
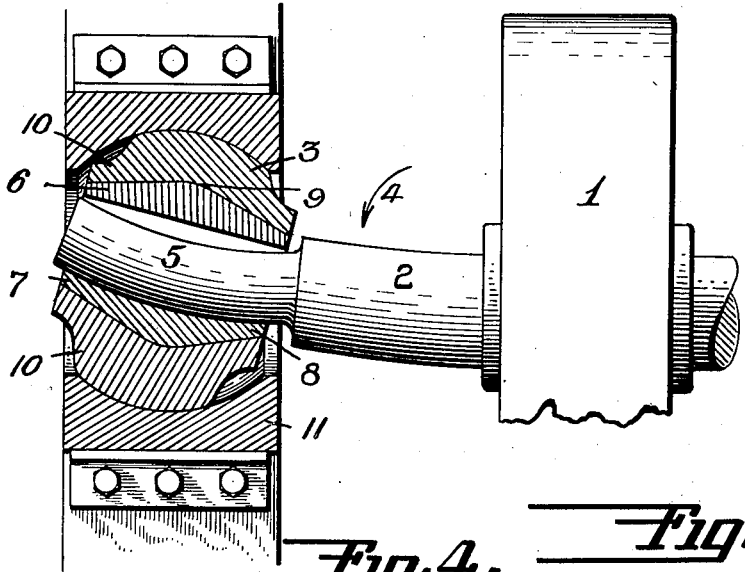
Fig. 1 shows in exaggerated form the condition of a shaft which is loaded in the middle and supported at each end, showing how the journal end of the shaft assumes a curved deforation, with maximum deflection near the middle.

The embodiment of the invention illustrated in Fig. 1 is the rotor 1 of a large gyroscope such as used for stabilizing ships. Said rotor is shown as mounted on shaft 2 and journalled at both ends in plain bearings 3, only one of which is illustrated. As is well known in gyroscopic apparatus of this character, the gyroscopic torque is transmitted from the rotor through the journals and bearings. As the gyroscope precesses back and forth, this torque continually changes in direction, being at times downwardly in the direction of the arrow 4 on the bearing 3, and consequently in the same direction as gravity at that time and at other times, in horizontal planes, and at other times upwardly. It will be understood of course, that the pressure on one bearing, due to the gyroscopic forces is always opposite in direction to the pressure on the opposite bearing. It will be apparent therefore that the load on the bearings in gyroscopic stabilizers is not in the same direction at all times, but continually varies.

From what is above stated, therefore, it will be apparent that the proper lubrication of these bearings has given much trouble and it was in the working out of the lubricating problem for gyroscopic rotors that the improvements set forth herein were made.

Figure 2:
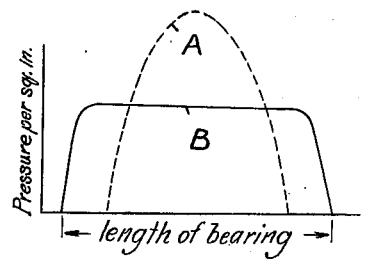
Fig. 2 shows diagrammatically the load distribution of such a shaft when the bearing is designed according to my invention, in full lines and dotted lines the conditions in an ordinary bearing.

Fig. 1 illustrates in a greatly exaggerated form, the condition that the shaft 2 and its reduced journal end 5 assumes where it is uniformly supported, and subject to a torque or load in the direction of the arrow 4, due to gravity, gyroscopic forces, or otherwise. The distribution of the pressure which brings about this condition is illustrated in Fig. 2 by dotted line A, showing how by far the greater portion is distributed near the center of the bearing and causing at that point therefore, under ordinary conditions, a much greater load on the bearing than at points near the ends of the bearing.

As stated above, if the bearing is originally designed with a babbitt of uniform thickness throughout the length thereof, this condition might not give rise to serious trouble in case of a moderate load distributed uniformly in the same direction, since the greatly increased load near the middle of the bearing would when the bearing was new, squeeze out some of the oil at that point toward the ends of the bearing and gradually wipe out the bearing until it was hollowed out to conform to the deflection of the shaft. Where, however, the load varies in direction and very heavy loads are used, this self aligning feature does not take place so readily, or with sufficient quickness to prevent serious difficulty with ordinary bearings under such conditions.

As above indicated, to correct this difficulty, I propose to employ a means for uniformly distributing the load on the bearing. In its simplest form, this means consists in employing babbitt 6 or other soft bearing material which has a sufficiently low modulus of elasticity to yield sufficiently at the points of maximum pressure, to distribute the load. To increase this effect, preferably the thickness of the babbitt is increased at points of the greatest deflection. As shown, the babbitt is thinnest near the two ends 7 and 8 of the bearing and thickest at the middle 9. The babbitt is shown supported in the usual self aligning bearing block 10 in the the support 11. By such means, a substantially uniform distribution of the load is obtained, as shown by the full line curve B in Fig. 2, with the result that equal lubrication throughout the length of the bearing is secured and journal trouble prevented.

Figure 4:
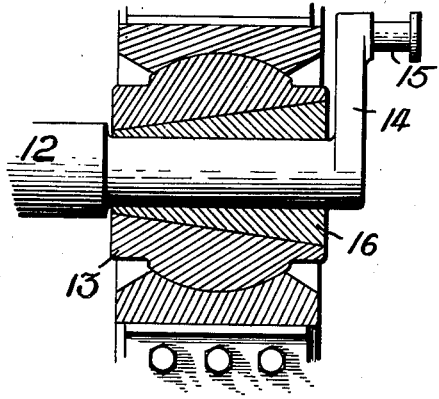
Fig. 4 shows the preferred form of bearing for such a condition.
Figure 3:
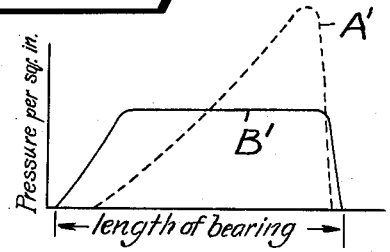
Fig. 3 shows diagrammatically the load distribution of a reciprocating engine, illustrating the load distribution in full lines when the bearing is constructed according to my invention and in dotted lines, the load distribution with an ordinary bearing.

The application of my invention to crank shaft lubrication is illustrated in Figs. 3 and 4, where the maximum load also varies in direction and amount, but occurs not in the middle of the bearing, but substantially at the crank shaft end of the same, as shown in Fig. 3 by the dotted lines, A'. In Fig. 4 the crank shaft 12 is shown as journalled in the bearing 13, the crank arm and crank pin being illustrated at 14 and 15. The babbitt 16 in this case is preferably of gradually increasing thickness as it approaches the crank shaft end, so that sufficient elastic yield of the babbitt will occur at the points of maximum load, to distribute the load uniformly on the bearing. In other words, my bearing permits the over-load stresses to be borne, not by the bearing surfaces wholly, but by the bending stress of the shaft itself. The load distribution is then illustrated by curve B'—(Fig. 3).

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention what I claim and desire to secure by Letters Patent is:

1. A babbitted bearing for shafts in which the babbitt possesses a low modulus of elasticity and is thicker at points along the bearing subject to the greater loads.

2. A babbitted bearing for shafts in which the babbitt is made of a varying thickness to deform sufficiently while within its elastic limit to conform to the longitudinal deformation of the shaft, said thickness being determined by the modulus of elasticity of the babbitt and the load per unit area.

3. The combination with a bearing in which, under normal conditions the load would otherwise be non-uniformly distributed along the bearing, of a babbitted lining therefor, the thickness of which varies from point to point along the bearing in accordance with the normal load distribution whereby uniform distribution of the load is obtained.

In testimony whereof I have affixed my signature.

ALEXANDER E. SCHEIN.